(12) United States Patent
Orozco

(10) Patent No.: US 6,774,610 B2
(45) Date of Patent: Aug. 10, 2004

(54) AC VOLTAGE REGULATOR APPARATUS AND METHOD

(75) Inventor: Sergio Orozco, Tijuana (MX)

(73) Assignee: Crydom Limited (GB)

( * ) Notice: Subject to any disclaimer, the term of this patent is extended or adjusted under 35 U.S.C. 154(b) by 51 days.

(21) Appl. No.: 10/289,067

(22) Filed: Nov. 6, 2002

(65) Prior Publication Data

US 2004/0085049 A1 May 6, 2004

(51) Int. Cl.[7] .............................. G05F 1/10; G05F 1/40
(52) U.S. Cl. ..................................... 323/235; 323/282
(58) Field of Search ................................ 323/235, 282, 323/283, 284, 269, 238; 361/78, 79, 88, 100

(56) References Cited

U.S. PATENT DOCUMENTS

| | | | |
|---|---|---|---|
| 5,633,576 A | * | 5/1997 | Rose et al. .................. 320/160 |
| 5,708,330 A | * | 1/1998 | Rothenbuhler et al. ..... 315/244 |
| 6,094,040 A | | 7/2000 | Meier et al. |
| 6,222,353 B1 | | 4/2001 | Pattamatta et al. |
| 6,239,583 B1 | * | 5/2001 | Lindbery et al. ............. 322/46 |
| 6,320,454 B1 | | 11/2001 | Pathak et al. |
| 6,489,759 B1 | * | 12/2002 | Acharya et al. ............ 323/297 |
| 6,541,879 B1 | * | 4/2003 | Wright ........................ 307/31 |

* cited by examiner

Primary Examiner—Rajnikant B. Patel
(74) Attorney, Agent, or Firm—Gibson, Dunn & Crutcher LLP; Stanley J. Gradisar

(57) ABSTRACT

The ac voltage regulator apparatus of the present invention uses back-to-back silicon-controlled rectifier ("SCR") power output switches which are triggered into conduction after being delayed for a period of time from the previous ac supply voltage zero point. The SCR switches are switching the load voltage at a determinate phase angle in order to obtain a constant true RMS voltage. The delay time of the trigger signal is variable and is changed to obtain regulation of the RMS voltage applied to the ac load. This regulation feature compensates for temperature changes, ac supply voltage variations, and ac load current changes.

19 Claims, 9 Drawing Sheets

AC VOLTAGE REGULATOR APPARATUS AND METHOD

FIELD OF THE INVENTION

This invention relates to voltage regulation, and more particularly, to providing a regulated, step down voltage from an unregulated supply of ac voltage to a variable load.

DETAILED DESCRIPTION OF THE INVENTION

Figure 1:
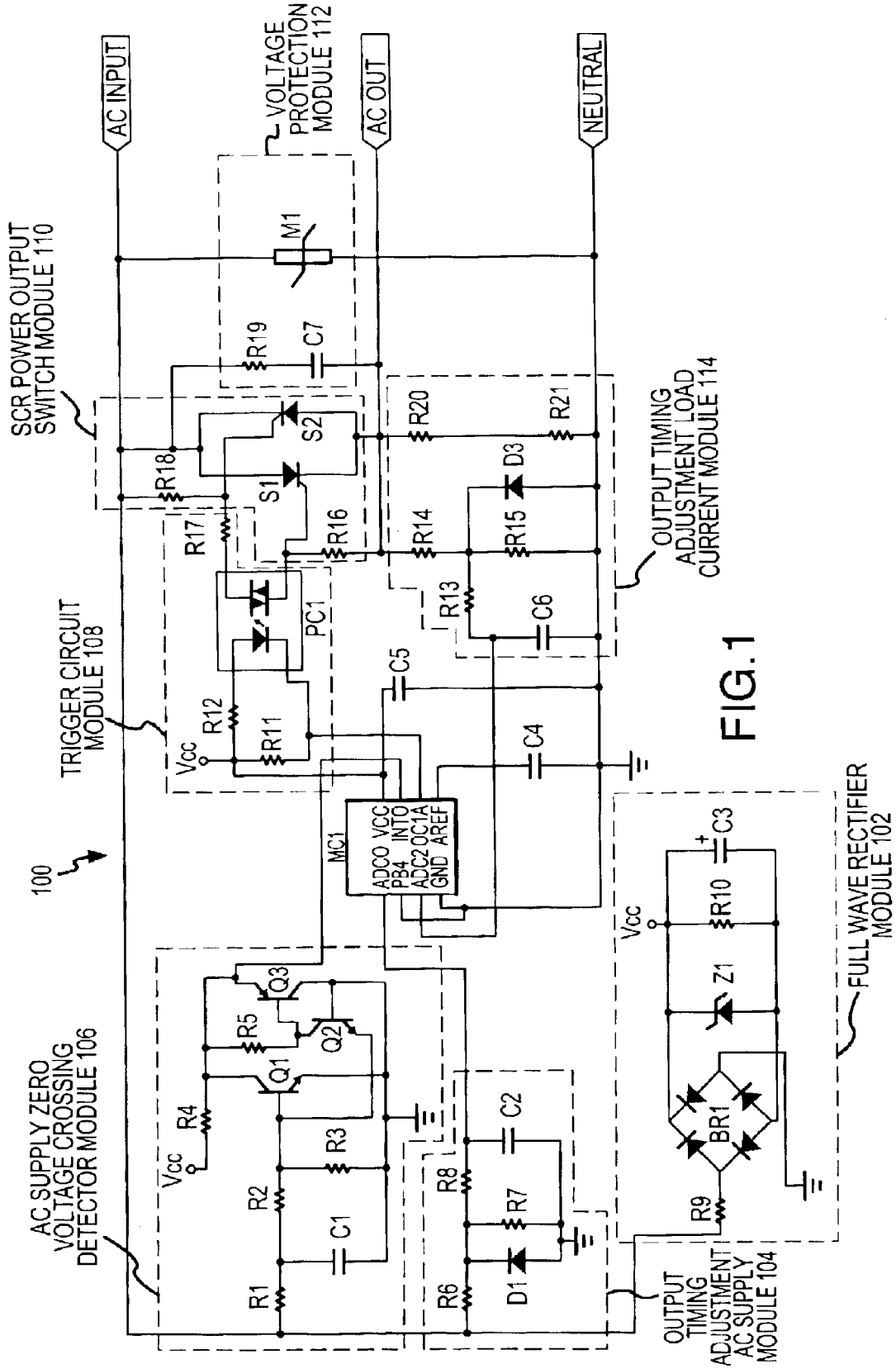
FIG. 1 shows an electronic schematic diagram of an embodiment of the ac voltage regulator apparatus of the present invention.

FIG. 1 shows an electronic schematic diagram of an embodiment of the ac voltage regulator apparatus of the present invention. The ac voltage regulator apparatus of the present invention has a circuit with back-to-back silicon-controlled rectifier ("SCR") power output switches which are triggered into conduction after being delayed for a period of time from the previous ac supply voltage zero point. The SCR switches are switching the load voltage at a determinate phase angle in order to obtain a constant true RMS voltage. The delay time of the trigger signal is variable and is changed to obtain regulation of the RMS voltage applied to the ac load. This regulation feature compensates for temperature changes, ac supply voltage variations, and ac load current changes.

The ac voltage regulator apparatus described below is a three terminal device, using the ac power supply to derive an internal dc supply voltage for the control and regulating circuitry as shown in FIG. 1. The phase angle control is generated by smart circuitry based in a microcontroller core. The ac voltage regulator apparatus may be applied to many different forms of ac load, including, but not limited to, igniters for different types of gas appliances, low voltage incandescent lamps, and low voltage heaters. The ac voltage regulator provides a regulated, true RMS output voltage.

Referring now to FIG. 1, AC Voltage Regulator 100 is made up of several circuit module components, including Full Wave Rectifier Module 102 having zener diode regulation and capacitor smoothing. Full Wave Rectifier Module 102 supplies the Vcc (control circuit DC bus) for the sensing and regulating circuits. Individual components of Full Wave Rectifier Module 102 include resistors R9 and R10, polarized capacitor C3, Full Wave Bridge Rectifier BR1, and zener diode Z1. In one embodiment of the invention, components of the Full Wave Rectifier Module 102 have the following values: R9 is 12 k; R10 is 6.8 k; C3 is 220 $\mu$F, 10V; and Z1 is 5.1V.

Output Timing Adjustment AC Supply Module 104 provides a signal, which is proportional to the peak level of the ac supply, to the microcontroller MC1. This signal is used to adjust the output timing as a function of ac supply voltage variations. Individual components of Output Timing Adjustment AC Supply Module 104 include resistors R6, R7, and R8, unpolarized capacitor C2, and diode D1. In one embodiment of the invention, components of the Output Timing Adjustment AC Supply Module 104 have the following values: R6 is 1000 k; R7 is 10 k; R8 is 100 k; and C2 is 220 pF.

AC Supply Zero Voltage Crossing Detector Module 106 is a circuit that generates a pulse signal, at every voltage zero, to provide a timing reference point for the microcontroller MC1. When the terminal marked AC Input is positive with respect to the terminal marked Neutral, bipolar signal transistor Q1 is the detecting element. When the terminal marked AC Input is negative with respect to the terminal marked Neutral, then bipolar signal transistors Q2 and Q3 are the detecting elements. The Neutral terminal is used as a voltage reference and return path of control circuitry. Individual components of AC Supply Zero Voltage Crossing Detector Module 106 include resistors R1, R2, R3, R4, and R5, unpolarized capacitor C1, and bipolar signal transistors Q1, Q2, and Q3. In one embodiment of the invention, components of the AC Supply Zero Voltage Crossing Detector Module 106 have the following values: R1 is 180 k; R2 is 180 k; R3 is 39 k; R4 is 27 k; R5 is 560 k; and C1 is 220 pF.

Trigger Circuit Module 108 is electrically isolated from the SCR power output switches S1 and S2. The closing of the triac switch in photo coupler PC1 connects the gates of S1 and S2 across the AC Input Terminal and the AC Output Terminal, providing sufficient gate current to activate whichever of S1 or S2 is forward biased. Individual components of Trigger Circuit Module 108 include resistors R11, R12, and R17 and photo coupler PC1 having a triac thyristor and an SCR thyristor. In one embodiment of the invention, PC1 is a TLP160J Thyristor Output Optoisolator available from Toshiba, and components of the Trigger Circuit Module 108 have the following values: R11 is 6.8 k; R12 is 680; and R17 is 220 k.

SCR Power Output Switch Module 110 has back-to-back SCR power output switches S1 and S2. When energized, SCR Power Output Switch Module 110 applies ac power to the ac load. Individual components of SCR Power Output Switch Module 110 include resistors R16 and R18, and SCR power output switches S1 and S2 In one embodiment of the invention, components of the SCR Power Output Switch Module 110 have the following values: R16 is 47; and R18 is 47.

Voltage Protection Module 112 provides protection for the SCR power output switches S1 and S2 against rapid changes in line voltage and excessive levels of line voltage. Individual components of Voltage Protection Module 112 include resistor R19, unpolarized capacitor C7, and metal oxide varistor M1, which has a voltage dependent resistance. Up to a specified voltage the resistance is very high, and above the specified voltage the resistance is low. This component is used to "clamp" supply line overvoltage transients to a safe level. In one embodiment of the invention, M1 is a V130LA2 varistor available from Littlefuse, and components of the Voltage Protection Module 112 have the following values: R19 is 47; and C7 is 0.033 $\mu$F.

Output Timing Adjustment Load Current Module 114 provides a signal to the microcontroller MC1 which is proportional to the peak of the load voltage. This signal is used to adjust the output timing as a function of load voltage changes which occur as a result of changes in load current. Individual components of Output Timing Adjustment Load Current Module 114 include resistors R13, R14, R15, R20, and R21, unpolarized capacitor C6, and diode D3. In one embodiment of the invention, components of the Output Timing Adjustment Load Current Module 114 have the following values: R13 is 100 k; R14 is 1M; R15 is 10 k; R20 is 330; R21 is 360; and C6 is 220 pF.

Unpolarized capacitors C4 and C5 are in the circuit to minimize any stray interference signals. In one embodiment of the invention, C4 is 0.22 $\mu$F and C5 is 0.1 $\mu$F. Microcontroller MC1 may be one of many types of suitable microcontrollers. In one embodiment of the invention, microcontroller MC1 is an ATtiny15L 8-bit Microcontroller with 1K Byte Flash available from Atmel. The information obtained from the zero crossing detector, input voltage monitoring, and output voltage monitoring is supplied to microcontroller MC1. Microcontroller MC1 is specifically programmed to calculate the necessary delay of the SCR trigger signals, and measures and maintains the RMS output voltage as shown in FIGS. 7A, 7B, 8, and 9. The trigger delay of the SCR power output switches S1 and S2 compensates for changes in ac supply voltage and changes in ac load current to maintain a true RMS output voltage.

Figure 2:
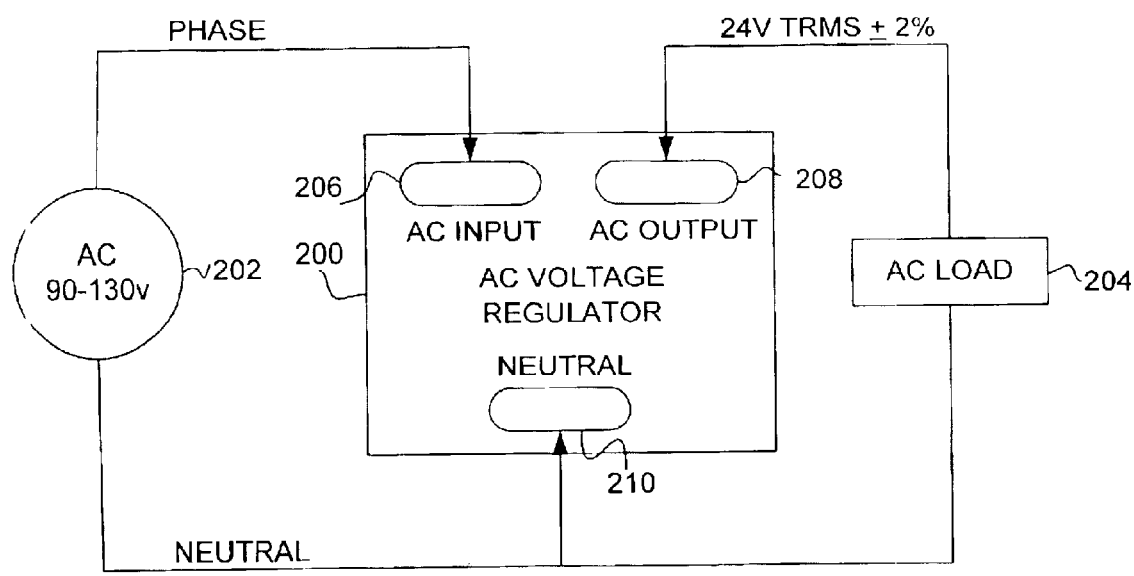
FIG. 2 shows a typical application of the ac voltage regulator apparatus of the present invention.

FIG. 2 shows a typical application of the ac voltage regulator apparatus of the present invention. Referring now to FIG. 2, AC Voltage Regulator 200 is connected to AC Source 202, which is typically between 90 to 130 volts, and AC Load 204. AC Voltage Regulator 200 has AC Input Terminal 206, AC Output Terminal 208, and Neutral Terminal 210. AC Load 204 may encompass many different forms of ac load, including, but not limited to, igniters for different types of gas appliances, low voltage incandescent lamps, and low voltage heaters.

Figure 3:
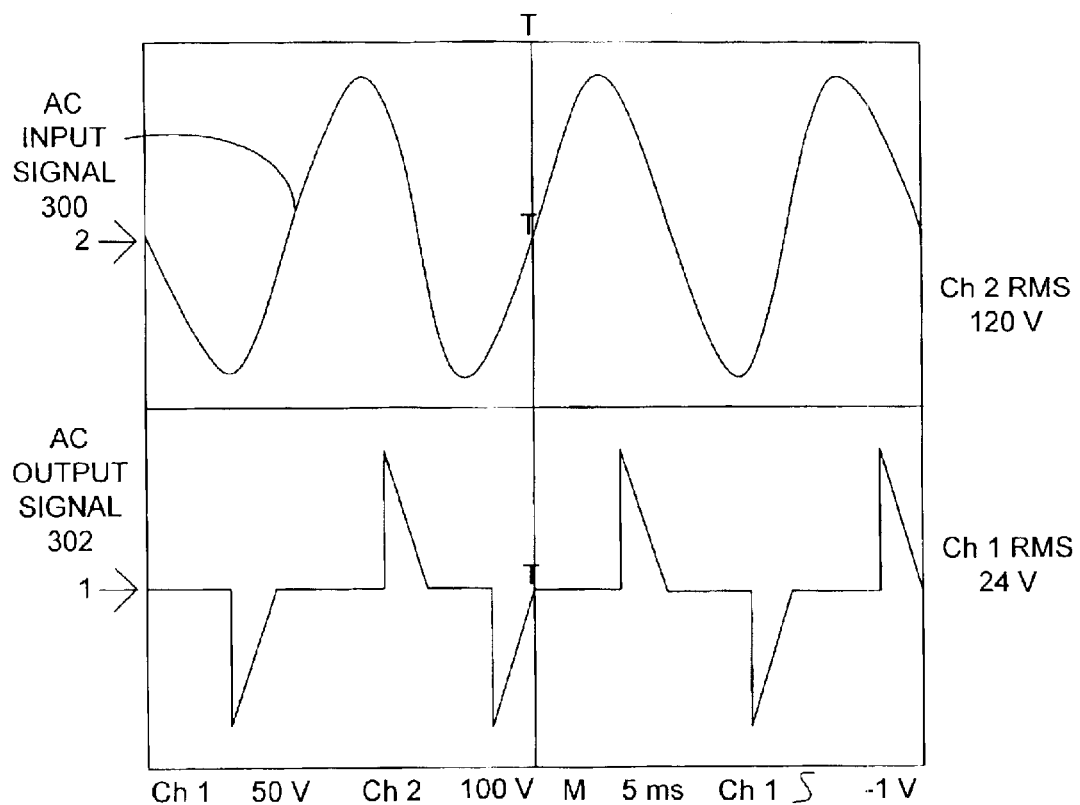
FIG. 3 shows oscilloscope traces of the ac voltage regulator output voltage signal in relation to the ac supply voltage signal of the ac voltage regulator apparatus of the present invention.

FIG. 3 shows oscilloscope traces of the ac voltage regulator output voltage signal in relation to the ac supply voltage signal of the ac voltage regulator apparatus of the present invention. Referring now to FIG. 3, AC Input Signal 300 is 120V RMS. AC Output Signal 302 shows the segments of the supply voltage which are applied to the ac load. AC Output Signal 302 is 24V RMS. Microcontroller MC1 is programmed to fire the SCR power output switches S1 and S2 at a point in time which supplies the AC Load 204, located between AC Output Terminal 208 and Neutral Terminal 210, with approximately 24V RMS.

Figure 4:
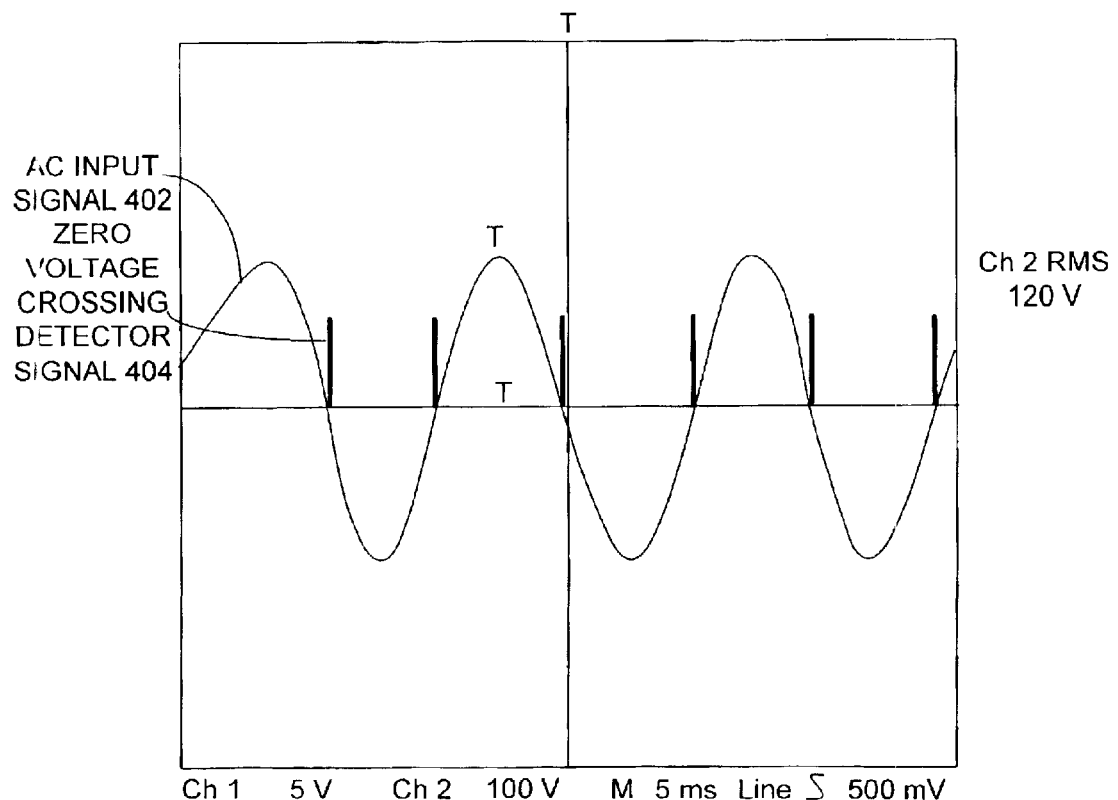
FIG. 4 shows oscilloscope traces of the output of the zero voltage crossing detector signal in relation to the ac supply voltage signal of the ac voltage regulator apparatus of the present invention.

FIG. 4 shows oscilloscope traces of the output of the zero voltage crossing detector signal in relation to the ac supply voltage signal of the ac voltage regulator apparatus of the present invention. Referring now to FIG. 4, Zero Voltage Crossing Detector Signal 404 is shown in relation to AC Input Signal 402. Zero Voltage Crossing Detector Signal 404 is used as the starting point for delaying the firing of SCR power output switches S1 and S2.

Figure 5:
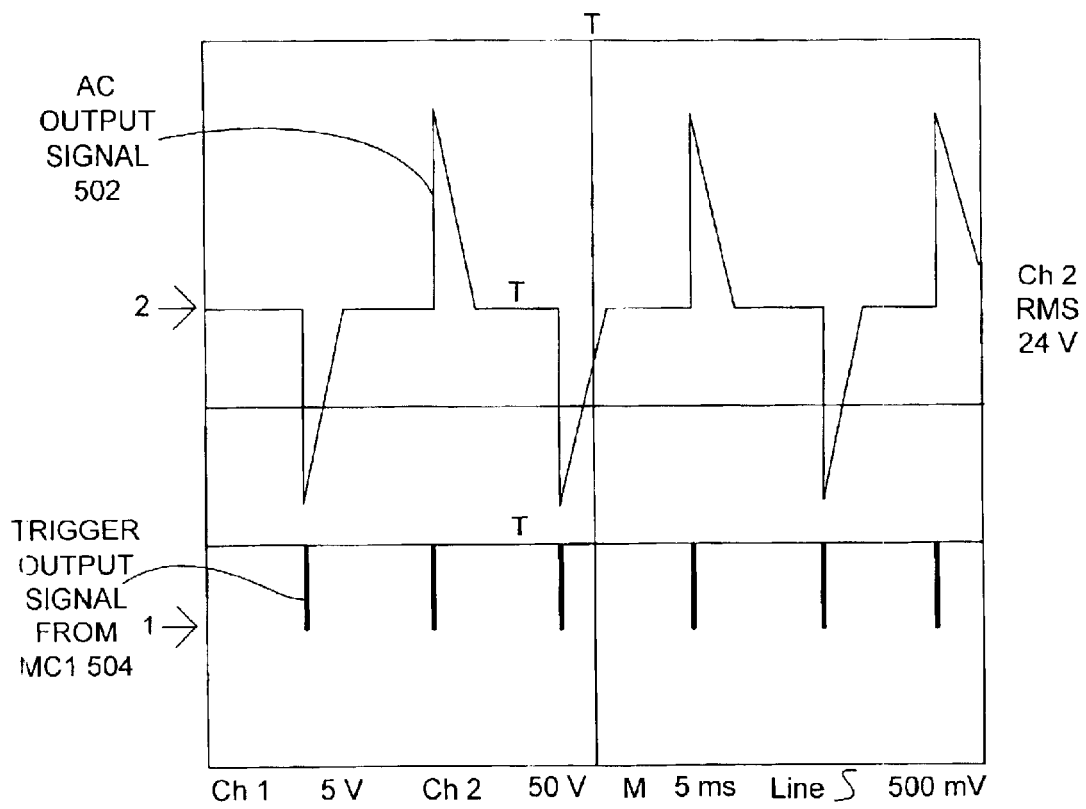
FIG. 5 shows oscilloscope traces of the trigger signal from the microcontroller in relation to the ac output signal of the ac voltage regulator apparatus of the present invention.

FIG. 5 shows oscilloscope traces of the trigger signal from the microcontroller in relation to the ac output signal of the ac voltage regulator apparatus of the present invention. Referring now to FIG. 5, AC Output Signal 502 is shown in relation to Trigger Output Signal From MC1 504. Trigger Output Signal From MC1 504 energizes the input of PC1 in Trigger Circuit Module 108 which in turn fires the SCR power output switches S1 and S2.

Figure 6:
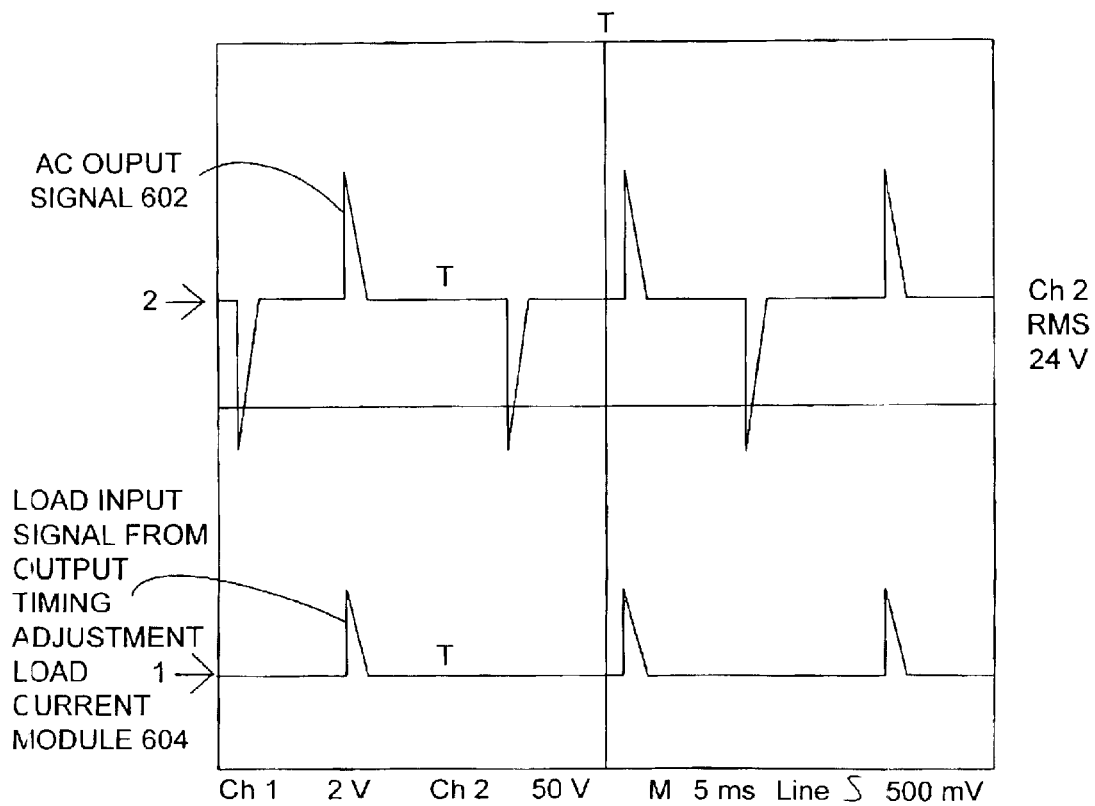
FIG. 6 shows oscilloscope traces of the signal fed back to the microcontroller from the output timing adjustment load condition circuit in relation to the ac output signal of the ac voltage regulator apparatus of the present invention.

FIG. 6 shows oscilloscope traces of the signal fed back to the microcontroller from the output timing adjustment load condition circuit in relation to the ac output signal of the ac voltage regulator apparatus of the present invention. Referring now to FIG. 6, Load Input Signal From Output Timing Adjustment Load Condition Module 604 is fed back to microcontroller MC1, which microcontroller MC1 uses to ensure that the firing point is adjusted (if necessary) to maintain the approximately 24V RMS between AC Output Terminal 208 and Neutral Terminal 210.

Figure 7A:
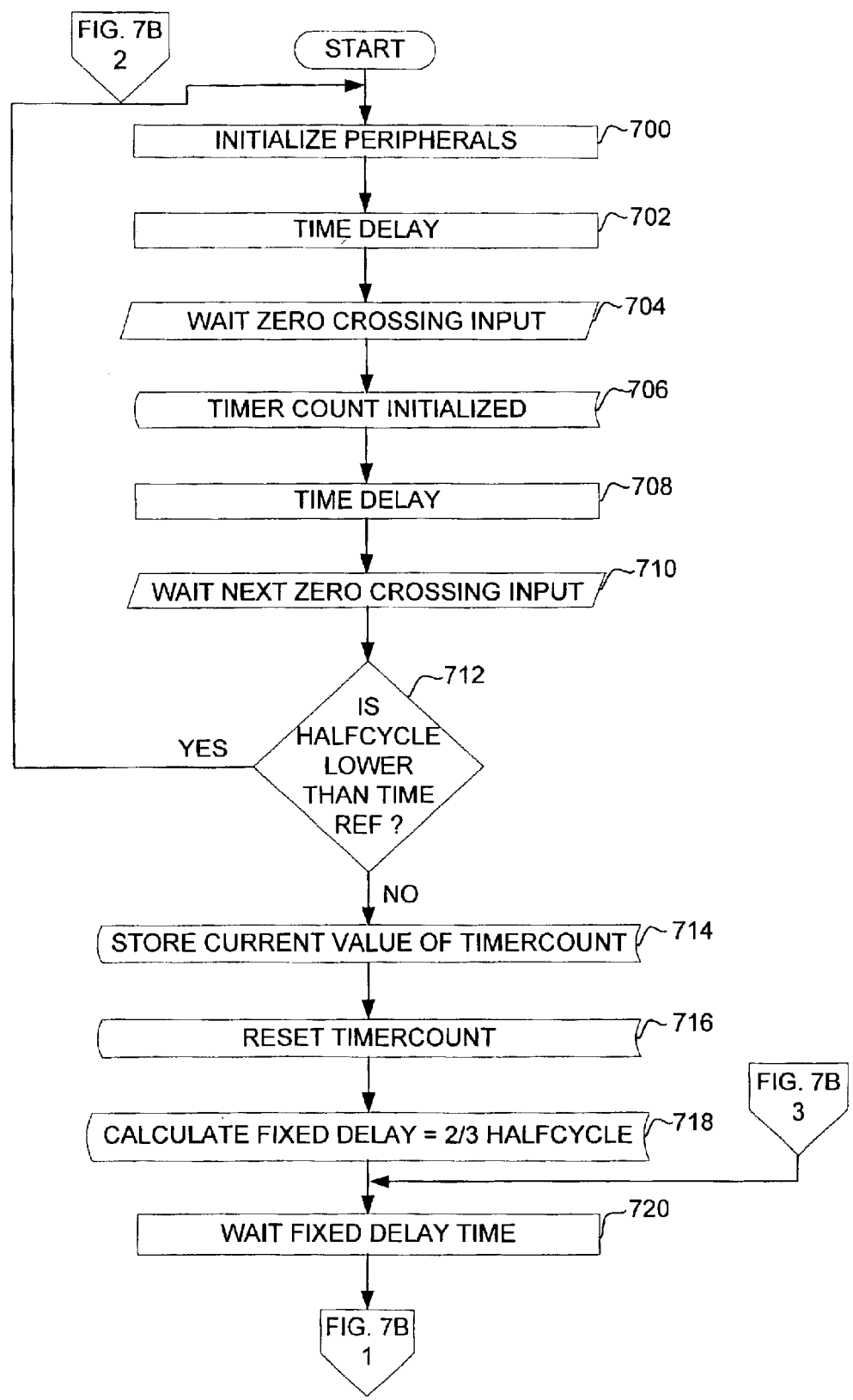
FIGS. 7A and 7B show a block flow diagram of the algorithm programmed into the microcontroller of the ac voltage regulator apparatus of the present invention.
Figure 7B:
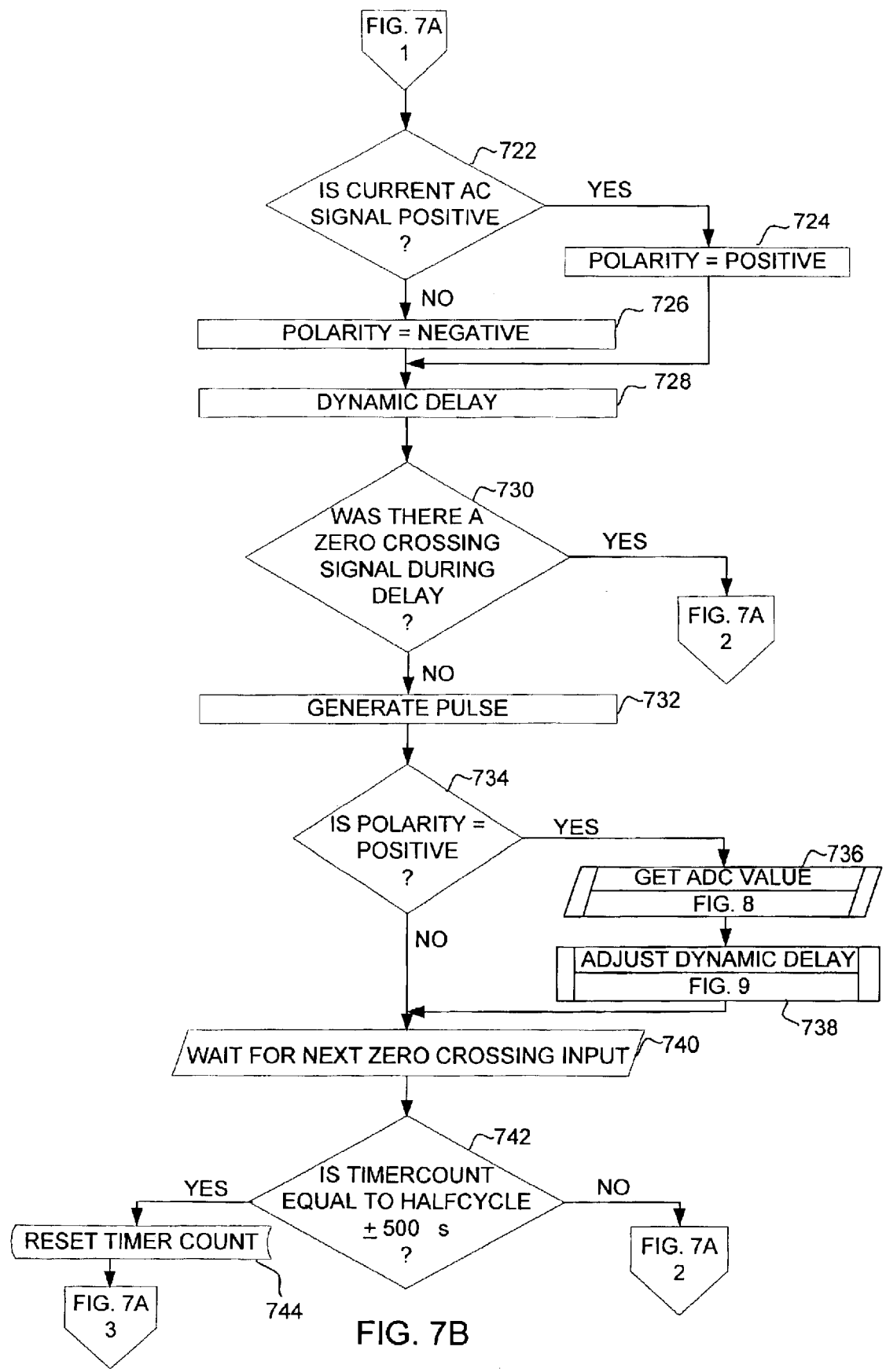

FIGS. 7A and 7B show a block flow diagram of the algorithm programmed into the microcontroller of the ac voltage regulator apparatus of the present invention. Referring now to FIGS. 7A and 7B, in block 700 the program begins by initializing peripherals, including ports, clock, timer, and certain program variables. In block 702 a time delay occurs to allow the power supply to rise to a working voltage level, typically about 0.5 seconds. In block 704 a wait occurs until the first zero crossing voltage signal input is received to begin to count the half cycle time. A TimerCount variable is then initialized in block 706. A time delay in block 708, typically about 150 $\mu$s, occurs to avoid potential false readings. Block 710 waits for the next zero crossing voltage signal input to be received. Internally, the TimerCount variable is counting the time from the first zero crossing voltage signal input to this next zero crossing voltage signal input. Block 712 checks to see if the half cycle time is lower than a constant value TimeRef. If the frequency of the ac source is 60 Hz, the halfcocked time will have a value equivalent to 8.33 ms. TimeRef is a constant value equivalent to the lowest frequency allowed to work properly. The microcontroller MC1 has an internal 16-bit timer, which is simulated by software using two 8-bit registers in cascade configuration, that is calibrated to run at 1.6 MHz clock rate. The two byte timer register is incremented each 0.625 $\mu$s. The TimerCount variable is the high byte of the 16 bit timer. TimeRef is fixed to 30 hex (approximately 7.68 ms), the lowest valid value allowed by TimerCount to work properly. If the half cycle time is lower than TimeRef, then control returns to block 700 where the algorithm restarts. If it is not, then in block 714 the current value of the TimerCount variable is stored in a HalfCycle variable.

In block 716, the TimerCount variable is reset, which occurs each time the ac source crosses by zero. Block 718 next calculates a value equivalent to ⅔ of the current value stored in the HalfCycle variable, and stores this value in a Fixed_Delay variable. In block 720 a time delay occurs equivalent to the time value calculated and stored in the Fixed_Delay variable. If the frequency of the ac supply is 60 Hz, the time delay stored in the Fixed_Delay variable would be 5.55 ms.

Referring now to FIG. 7B, block 722 tests to see of the current ac signal is positive. If the ac signal half cycle is positive, then in block 724 a Polarity variable is set equal to positive. If block 722 determines that the current ac signal half cycle is not positive, then in block 726 the Polarity variable is set equal to negative. This test for polarity is used to synchronize load voltage capture and to update the dynamic time trip point.

In block 728 a dynamic time delay occurs. This time delay is proportional to the output voltage and is determined by the Adjust Dynamic Delay Routine of FIG. 9. Block 730 then determines if a zero crossing signal occurred during the previous dynamic delay period. This test is for security purposes only. If yes, then control returns to block 700 where the algorithm restarts. If no, then in block 732 microcontroller MC1 generates a pulse which turns on whichever of SCR power output switches S1 or S2 is forward biased. This pulse causes the triac switch in photo coupler PC1 to turn on, delay for 150 μs, and then turn off.

Block 734 then determines if the Polarity variable is equal to positive, indicating a current ac signal positive half cycle. If yes, block 736 calls the Get ADC Value Routine of FIG. 8 (discussed below). Upon returning from FIG. 8, block 738 calls the Adjust Dynamic Delay Routine of FIG. 9 (discussed below). Upon returning from FIG. 9, control flows to block 740.

If block 734 determines that the Polarity variable is equal to negative, indicating a current ac signal negative half cycle, then control flows to block 740. Block 740 waits for the next zero voltage crossing detector signal.

Block 742 determines if the TimerCount variable is equal to the HalfCycle variable plus or minus a tolerance value of 500 μs. If not, then control returns to block 700 where the program restarts. This check is to determine the repeatability of the sequence and restarts in the case of corruption of the ac line voltage, missing voltage, or change in frequency of the ac source. If yes, then block 744 resets the TimerCount variable for the start of a new cycle. Control then returns to block 720 in FIG. 7A.

Figure 8:
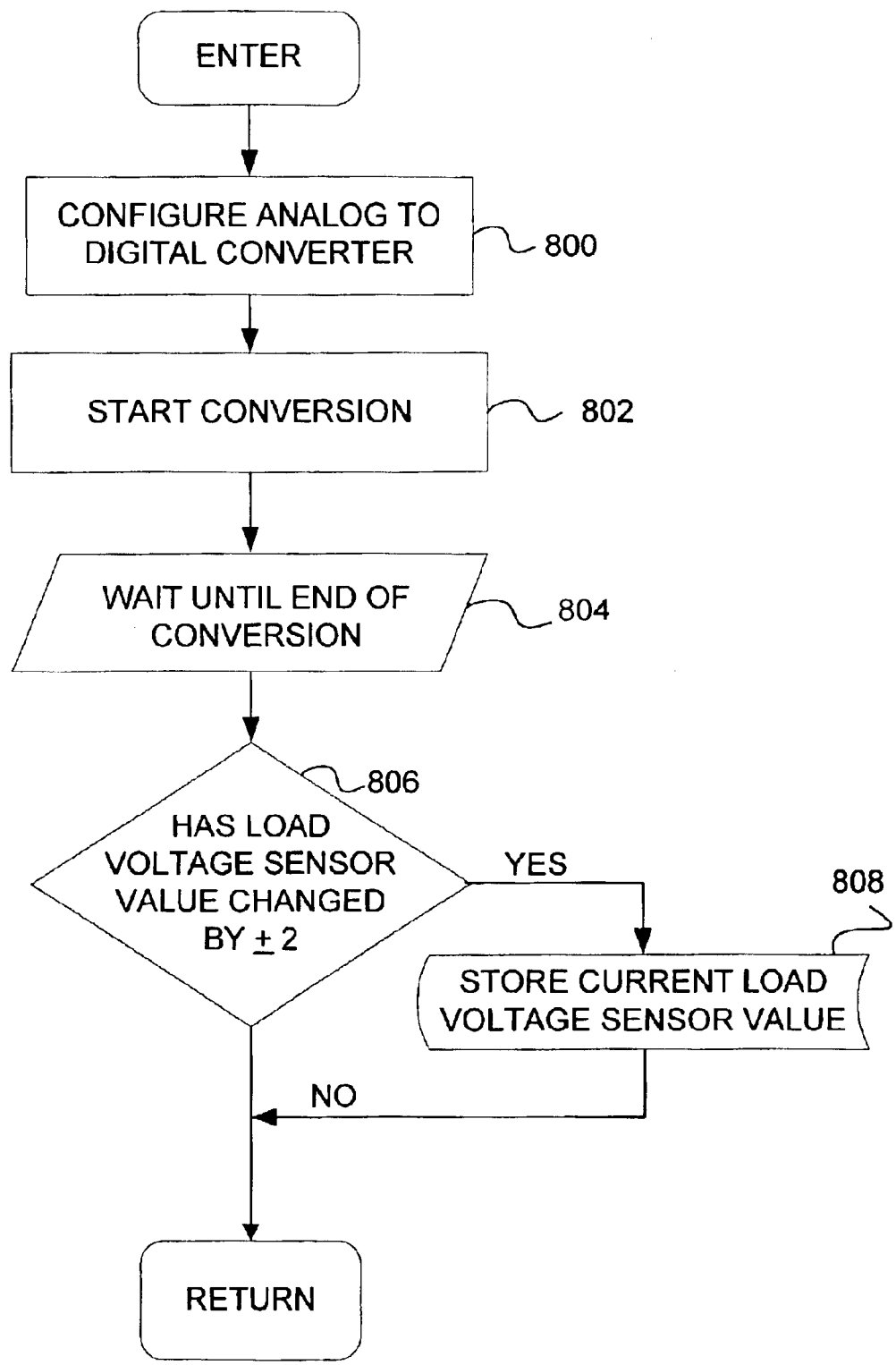
FIG. 8 shows a block flow diagram of the Get ADC Value subroutine of the algorithm programmed into the microcontroller of the ac voltage regulator apparatus of the present invention.

FIG. 8 shows a block flow diagram of the Get ADC Value subroutine of the algorithm programmed into the microcontroller of the ac voltage regulator apparatus of the present invention. Referring now to FIG. 8, which is called from block 734 in FIG. 7B, in block 800 the Analog To Digital Converter (ADC) is configured, which entails configuring the ADC channel, clock frequency, and interrupts. Block 802 starts the conversion. Block 804 waits until the end of the conversion, which typically will run between 25–65 μs.

The microcontroller MC1 has an internal analog to digital converter with a voltage reference of 2.56 Vdc range. For example, if the analog voltage is 0 Vdc, then the ADC value is equal to 0+1 digital units. For an analog voltage of 1.2 Vdc, the ADC value is equal to 119±1 digital units. For an analog voltage of 2.56 Vdc, the ADC value is equal to 255±1 digital units. To reduce the sensitivity in the voltage sensor values and the trip time variables, the tolerance for taking readings is ±2 digital units. Block 806 determines if the current load voltage sensor value has changed by plus or minus two digital units compared to the previous load voltage sensor value. If no, control returns to FIG. 7B at block 738. If yes, then in block 808 the current load voltage sensor value is stored. Control then returns to FIG. 7B at block 738.

Figure 9:
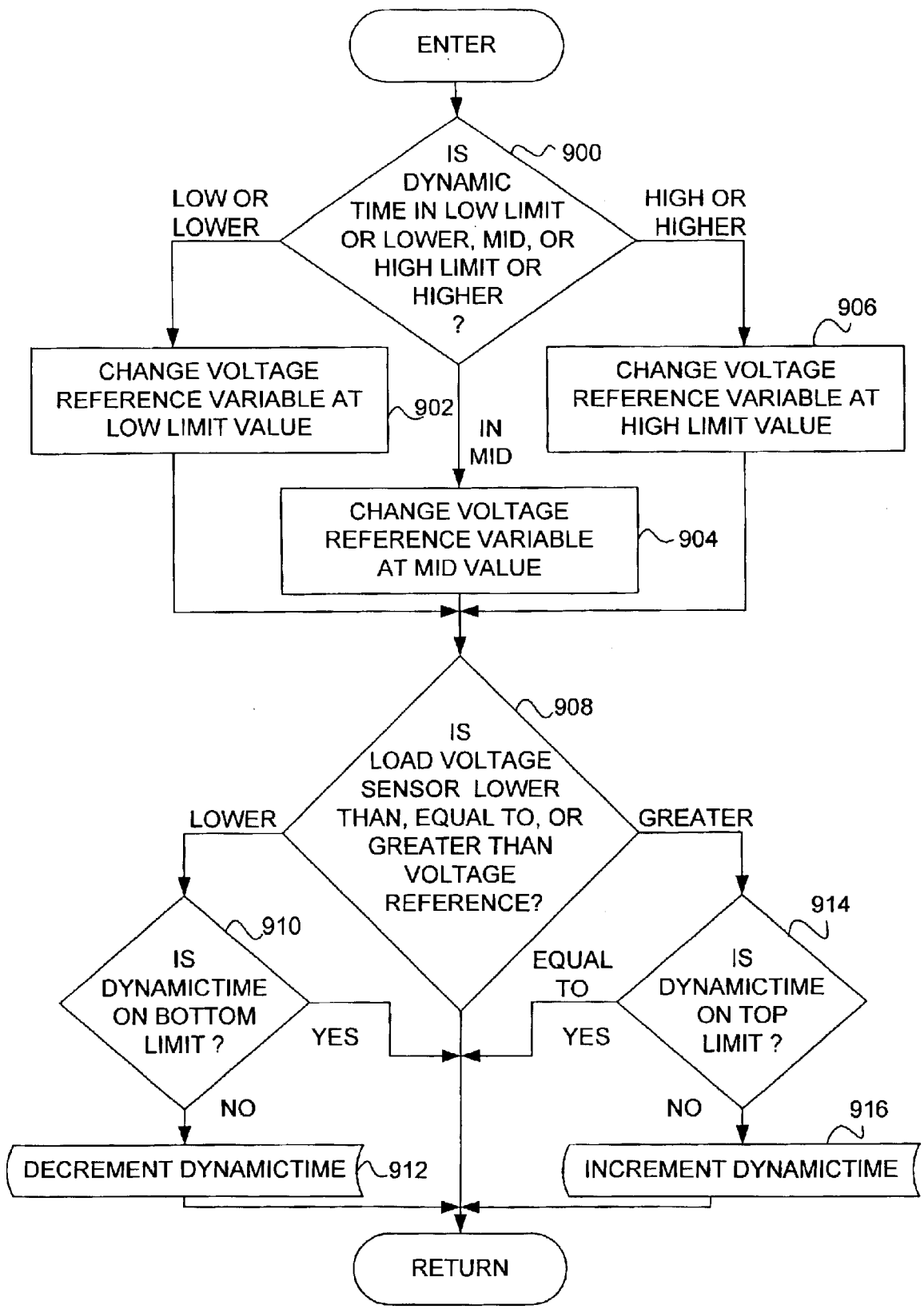
FIG. 9 shows a block flow diagram of the Adjust Dynamic Delay subroutine of the algorithm programmed into the microcontroller of the ac voltage regulator apparatus of the present invention.
Figure 10:
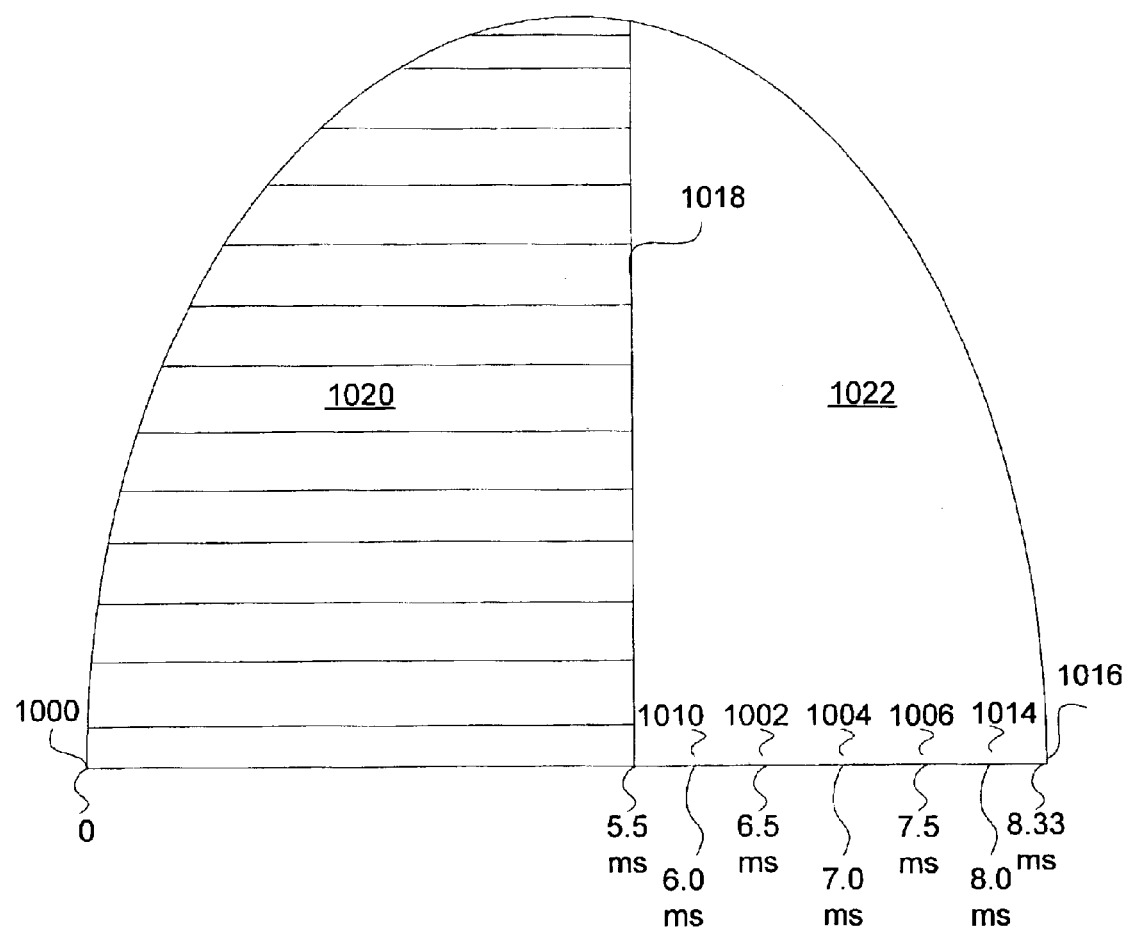
FIG. 10 shows a graph of the half cycle in relation to FIG. 9.

FIG. 9 shows a block flow diagram of the Adjust Dynamic Delay subroutine of the algorithm programmed into the microcontroller of the ac voltage regulator apparatus of the present invention, and FIG. 10 shows a graph of the half cycle in correlation to FIG. 9. Referring now to FIG. 10, the half cycle starts at Zero Voltage Crossing 1000 and goes to half cycle positive 1016. The half cycle is divided by ⅔ half cycle line 1018 into Fix Delay Range 1020 and Dynamic Delay Range 1022. If the ac power supply is 60 Hz, ⅔ of the half cycle will occur at 5.5 ms from the Zero Voltage Crossing 1000. Similarly, Bottom Limit 1010 will occur at 6.0 ms, Low Limit 1002 at 6.5 ms, Mid Limit 1004 at 7.0 ms, High Limit 1006 at 7.5 ms, and Top Limit 1014 at 8.0 ms from the zero voltage crossing.

Referring now to FIG. 9, which is called from block 736 in FIG. 7B, and to FIG. 10, in block 900 the dynamic delay is tested in order to adjust the voltage reference of the load voltage according to the dynamic time position. Block 900 determines if the dynamic time is in the low limit or lower, in the mid level, or in the high limit or higher. The low limit for voltage references purposes is defined as the range that is greater than or equal to Bottom Limit 1010 but less than or equal to Low Limit 1002. If the dynamic time is in the low limit or lower, then in block 902 the VrefVar variable is changed at the Low Limit 1002 value and control flows to block 908.

The mid limit for voltage references purposes is defined as the range that is greater than Low Limit 1002 but less than High Limit 1006. If the dynamic time is in the mid limit, then in block 904 the VrefVar variable is changed at the mid value and control flows to block 908.

The high limit for voltage references purposes is defined as the range that is greater than or equal to High Limit 1006 but less than or equal to Top Limit 1014. If the dynamic time is in the high limit or higher, then in block 906 the VrefVar variable is changed at the high limit value and control flows to block 908.

Block 908 determines if the current load voltage sensor value is lower than, equal to, or greater than the load voltage reference value held in the VrefVar variable. If the load voltage sensor value is lower than the VrefVar variable value, then block 910 determines if the dynamic time is on Bottom Limit 1010. This is a security limit. If the ac power supply is 60 Hz and the dynamic time is at Bottom Limit 1010, the trip time from the zero voltage crossing would be equivalent to 6 ms. If the dynamic time is on Bottom Limit 1010, control returns to block 740 in FIG. 7B. If not, then in block 912 the dynamic time is decremented by one unit, which is approximately 159 μs. Control then returns to block 740 in FIG. 7B.

If the load voltage sensor value determined in block 908 is equal to the VrefVar variable value, then the dynamic time is unchanged and control returns to block 736 in FIG. 7B.

If the load voltage sensor value determined in block 908 is higher than the VrefVar variable value, then block 914 determines if the dynamic time is on Top Limit 1014. This is a security limit. If the ac power supply is 60 Hz and the dynamic time is at Top Limit 1014, the trip time from the zero voltage crossing would be equivalent to 8 ms. If the dynamic time is on Top Limit 1014, control returns to block 736 in FIG. 7B. If not, then in block 916 the dynamic time is incremented by one unit, which is approximately 159 μs. Control then returns to block 736 in FIG. 7B.

Having described the present invention, it will be understood by those skilled in the art that many changes in construction and circuitry and widely differing embodiments and applications of the invention will suggest themselves without departing from the scope of the present invention.

What is claimed is:

1. An ac voltage regulator apparatus comprising:
a circuit, said circuit further comprising:
an output timing adjustment ac supply module;
an ac supply zero voltage crossing detector module connectable to said output timing adjustment ac supply module;
a trigger circuit module;
a silicon-controlled rectifier power output switch module connectable to said trigger circuit module;
an output timing adjustment load current module connectable to said silicon-controlled rectifier power output switch module; and
a microcontroller connectable to said output timing and adjustment ac supply module and to said ac supply zero voltage crossing detector module and to said trigger circuit module and to said silicon-controlled rectifier power output switch module and to said output timing adjustment load current module;
wherein said silicon-controlled rectifier power output switch module is triggered into conduction by said microcontroller after being delayed for a period of time from a previous ac supply voltage zero point to obtain a constant true RMS voltage.

2. The ac voltage regulator apparatus according to claim 1 further comprising:
an ac input terminal connectable to said circuit;
an ac output terminal connectable to said circuit;
a neutral terminal connectable to said circuit;
an ac power supply connectable between said ac input terminal and said neutral terminal; and
an ac load connectable between said ac output terminal and said neutral terminal;
wherein the ac voltage regulator apparatus derives an internal dc supply voltage from said ac power supply for control and regulation.

3. The ac voltage regulator apparatus according to claim 2 wherein said ac load further comprises a one of an igniter for a gas appliance, a low voltage incandescent lamp, and a low voltage heater.

4. The ac voltage regulator apparatus according to claim 2 wherein said output timing adjustment ac supply module further comprises:
an unpolarized capacitor;
at least one resistor connectable to said unpolarized capacitor; and
a diode connectable to said at least one resistor;
wherein said output timing adjustment ac supply module provides a signal to said microcontroller which is proportional to a peak level of said ac power supply and said signal adjusts an output timing as a function of a voltage variations of said ac power supply.

5. The ac voltage regulator apparatus according to claim 2 wherein said silicon-controlled rectifier power output switch module further comprises:
a first silicon controlled rectifier power output switch;
a second silicon controlled rectifier power output switch, wherein said first and second silicon controlled rectifier power output switches are connectable back-to-back; and
at least one resistor connectable to said first and second silicon controlled rectifier power output switches;
wherein said silicon-controlled rectifier power output switch module applies said ac power supply to said ac load.

6. The ac voltage regulator apparatus according to claim 5 wherein said trigger circuit module further comprises:
a photo coupler having a triac switch; and
at least one resistor connectable to said photo coupler;
wherein when said triac switch closes, said photo coupler connects said first silicon controlled rectifier power output switch and said second silicon controlled rectifier power output switch across said ac input terminal and said ac output terminal, activating a one of said first and second silicon controlled rectifier power output switch that is forward biased.

7. The ac voltage regulator apparatus according to claim 5 wherein said circuit further comprises:
a voltage protection module connectable to said silicon-controlled rectifier power output switch module and to said output timing adjustment load current module.

8. The ac voltage regulator apparatus according to claim 7 wherein said voltage protection module further comprises:
a metal oxide varistor;
an unpolarized capacitor connectable to said metal oxide varistor; and
at least one resistor connectable to said unpolarized capacitor;
wherein said voltage protection module protects said first and second silicon controlled rectifier power output switches from a rapid change in line voltage and an excessive level of line voltage.

9. The ac voltage regulator apparatus according to claim 1 wherein said circuit further comprises:
a full-wave rectifier module connectable to said output timing adjustment ac supply module.

10. The ac voltage regulator apparatus according to claim 9 wherein said full-wave rectifier module further comprises:
a full wave bridge rectifier;
a zener diode connectable to said full wave bridge rectifier;
at least one resistor connectable to said zener diode; and
a polarized capacitor connectable to said at least one resistor;
wherein said full-wave rectifier module supplies a control circuit dc bus for sensing and regulating circuits within the voltage regulator apparatus.

11. The ac voltage regulator apparatus according to claim 1 wherein said ac supply zero voltage crossing detector module further comprises:
an unpolarized capacitor;
connectable to said unpolarized capacitor; and
at least three bipolar signal transistors connectable to said at least one resistor;
wherein said ac supply zero voltage crossing detector module generates a pulse signal at every voltage zero to provide a timing reference point for said microcontroller.

12. The ac voltage regulator apparatus according to claim 1 wherein said output timing adjustment load current module further comprises:
a diode;
at least one resistor connectable to said diode; and
an unpolarized capacitor connectable to said at least one resistor;
wherein said output timing adjustment load current module provides a signal to said microcontroller that is proportional to a peak of a load voltage.

13. A method for controlling a voltage regulator circuit utilizing a programmable microcontroller, the method comprising the steps of:

(a) receiving in said programmable microcontroller a first signal proportional to a peak level of an ac supply voltage;

(b) receiving in said programmable microcontroller a pulse signal at every ac supply voltage zero crossing point;

(c) receiving in said programmable microcontroller a second signal proportional to a peak level of an ac load voltage;

(d) processing in said programmable microcontroller said first signal, said pulse signal, and said second signal, wherein said microcontroller processes said pulse signal as a timing reference for use as a starting point for calculating a delay in the firing of at least one of two silicon controlled rectifier power output switches, and further wherein said microcontroller processes said first signal to adjust an output timing as a function of variations in said ac supply voltage, and further wherein said microcontroller processes said second signal to adjust said output timing as a function of variations in said ac load voltage; and (e) sending by said programmable microcontroller a trigger signal to initiate the firing of said at least one of two silicon controlled rectifier power output switches;

wherein a constant true RMS voltage is maintained between an ac output terminal and a neutral terminal of the voltage regulator circuit.

14. A method according to claim 13 wherein said receiving step (a) further comprises the step of:

generating said first signal in an output timing adjustment ac supply module of the voltage regulator circuit connectable to said programmable microcontroller.

15. A method according to claim 13 wherein said receiving step (b) further comprises the step of:

generating said pulse signal in an ac supply zero voltage crossing detector module of the voltage regulator circuit connectable to said programmable microcontroller.

16. A method according to claim 13 wherein said receiving step (c) further comprises the step of:

generating said second signal in an output timing adjustment load current module of the voltage regulator circuit connectable to said programmable microcontroller.

17. A method according to claim 13 wherein said sending step (e) further comprises the steps of:

receiving said trigger signal in a trigger circuit module of the voltage regulator circuit connectable to said programmable microcontroller;

closing a triac switch of a photo coupler in said trigger circuit module, wherein said at least one of two silicon controlled rectifier power output switches that is forward biased is activated;

delaying the opening of said triac switch for a predetermined period of time; and opening said triac switch, causing said at least one of two silicon controlled rectifier power output switches that is forward biased to deactivate.

18. A method according to claim 13 further comprising the step of:

supplying said constant true RMS voltage to an ac load connectable between said ac output terminal and said neutral terminal.

19. A method according to claim 18 wherein saidac load is a one of an igniter for a gas appliance, a low voltage incandescent lamp, and a low voltage heater.

* * * * *